United States Patent [19]

Yamazaki et al.

[11] Patent Number: 4,794,413
[45] Date of Patent: Dec. 27, 1988

[54] IMAGE RECORDING APPARATUS

[75] Inventors: Koji Yamazaki, Ebina; Shigenori Ueda, Yokosuka; Toshiyuki Ehara, Yokohama; Yutaka Udagawa, Kawasaki, all of Japan

[73] Assignee: Canon Kabushiki Kaisha, Tokyo, Japan

[21] Appl. No.: 85,862

[22] Filed: Aug. 17, 1987

[30] Foreign Application Priority Data

Aug. 20, 1986 [JP] Japan .................. 61-192751
Nov. 19, 1986 [JP] Japan .................. 61-275565

[51] Int. Cl.⁴ .......................... G01D 15/00
[52] U.S. Cl. ...................... 346/160; 346/154
[58] Field of Search ............ 346/160, 107 R, 108, 346/154; 358/300, 302; 364/518–523; 400/119; 101/DIG. 13; 355/8

[56] References Cited

U.S. PATENT DOCUMENTS 4,491,875  1/1985  Kawamura .................. 358/298

FOREIGN PATENT DOCUMENTS

| 0024521 | 3/1981 | European Pat. Off. | ............ 346/160 |
| 0180391 | 5/1986 | European Pat. Off. | ............ 346/160 |
| 1179774 | 1/1970 | United Kingdom | ............ 346/160 |
| 1540525 | 2/1979 | United Kingdom | ............ 346/160 |
| 1594667 | 8/1981 | United Kingdom | ............ 346/160 |
| 2110899 | 6/1983 | United Kingdom | ............ 346/160 |

*Primary Examiner*—Arthur G. Evans
*Attorney, Agent, or Firm*—Fitzpatrick, Cella, Harper & Scinto

[57] ABSTRACT

An electrophotographic printer in which the data of the surface condition of photosensitive drum are stored in a memory in advance and are read at image recording for correcting an irregularity in the surface condition of the photosensitive drum.

11 Claims, 10 Drawing Sheets

FIG. 15

IMAGE RECORDING APPARATUS

BACKGROUND OF THE INVENTION

1. Field of the Invention

The present invention relates to an apparatus for recording an image on a recording medium.

2. Related Background Art

In already known apparatus of this kind, image signals read from a reader (or an original image reading unit) or a computer are converted into on/off signals for modulating a beam of a semiconductor laser. The modulated beam is deflected by a rotary polygon mirror having plural mirror faces to scan a rotary cylindrical photosensitive member at a constant speed in the axial direction, thereby forming an electrostatic latent image on the photosensitive member rotated at a constant speed. Image development, image transfer and image fixing are then conducted according to a known electrophotographic process to obtain a fixed image on a transported recording medium, for example a recording sheet.

The above-mentioned photosensitive member is inevitably associated with a certain irregularity in the sensitivity. More particularly in an amorphous silicon photosensitive member prepared by plasma CVD process, it is difficult to maintain the irregularity of sensitivity within 20 V. In addition an electrophotographic apparatus employing a laser optical system, for example a laser beam printer, is associated with a certain irregularity in the incident light intensity caused by interference, and a uniform electric potential has been difficult to obtain because of these factors.

In an image recording apparatus utilizing a halogen lamp or a fluorescent lamp as the light source, single or plural slits are provided in the optical path from the light source to the photosensitive member for compensating for the unevenness in the axial direction of the photosensitive member, thereby regulating the illuminating light intenstty and thus realizing a uniform potential of the latent image.

However, in an image recording apparatus utilizing a laser scanning optical system, it is technically difficult to regulate the light intensity by controlling the width of exposure, and, for this reason, it has been difficult to avoid the unevenness in the sensitivity of photosensitive member and in the incident light intensity caused by interference.

In a laser scanning optical system, reversal development is employed frequently, because the laser beam exposure in the white or background area of the original image is preferred, in comparison with the exposure in the black or character area, in reducing the light emitting period of the laser and in preventing the deterioration of resolution of the latent image, caused by a tailing effect or fluctuation of the laser spot. In such a process, however, the potential in the exposed area determines the black area of the resulting image, so that the irregularity in the sensitivity of the photosensitive member is directly reflected in the unevenness of the image density, thus deteriorating the image quality.

Also in such conventional apparatus, the surface potential of the photosensitive drum is controlled by detection of the surface potential regardless of the position of the photosensitive drum and control of the amount of charge or exposure according to thus detected value.

However such process control is often unable to provide uniform surface potential over the entire surface of the photosensitive drum, because it may have an aberration in the rotary axis or because the surface characteristic is not completely uniform over the entire surface. For these reasons it has been difficult to precisely control the surface potential of the photosensitive member by the potential control methods mentioned above. $ Also the present applicant already disclosed, in the U.S. Patent Applications Ser. Nos. 765,938, 897,053 (filed Aug. 15, 1986), 898,096 (filed Aug. 20, 1986), 900,603 (filed Aug. 26, 1986) and 010,539 (filed Feb. 3, 1987), apparatus for forming pulse-width modulated signals according to image signals, and emitting a beam in response to the signals thereby forming an image. However these apparatus are not provided with a means for correcting the characteristics of the photosensitive member.

SUMMARY OF THE INVENTION

An object of the present invention is to eliminate the above-mentioned drawbacks.

Another object of the present invention is to provide an improved image recording apparatus.

Still another object of the present invention is to provide an image recording apparatus capable of providing a reproduced image of high quality.

Still another object of the present invention is to provide an image recording apparatus capable of reproducing an image of excellent quality with a simple structure.

Still another object of the present invention is to provide an image recording apparatus capable of image recording with an optimum recording condition according to the recording position on a recording member.

The foregoing and still other objects of the present invention, and the advantages thereof, will become fully apparent from the appended claims and the following description to be taken in conjunction with the attached drawings.

DETAILED DESCRIPTION OF THE PREFERRED EMBODIMENTS

(First embodiment)

Figure 1:
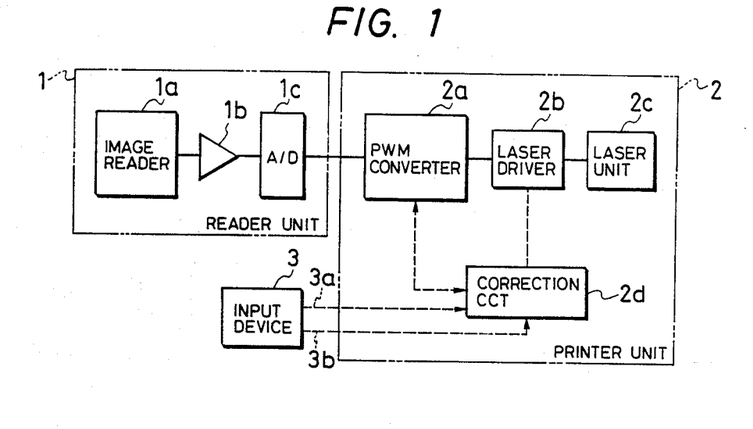
FIG. 1 is a block diagram of a laser beam printer embodying the present invention.
Figure 2:
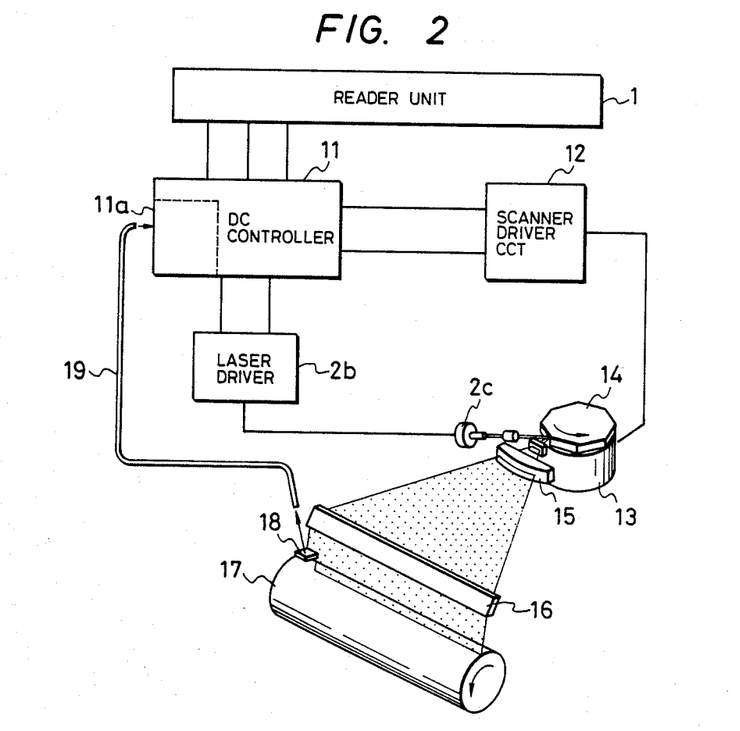
FIG. 2 is a schematic view showing the laser exposure operation of the laser beam printer of the embodiment of the present invention.

FIG. 1 is a block diagram of a laser beam printer embodying the present invention. A reader unit 1 is composed of an image reader 1a, composed of an image sensor such as a CCD, an amplifier 1b, and an A/D converter 1c. A printer unit 2 is composed of a pulse-width modulator 2a, a laser driver 2b, a laser unit 2c, a correction circuit 2d etc. The pulse-width modulator (PWM) 2a generates pulse-width modulated signals in response to the image information supplied from the A/D converter 1c, thereby turning on and off the laser beam. The correction circuit 2d corrects, by a predetermined amount, the pulse duration of the modulated signal supplied from the PWM converter 2a according to correction data 3a (laser turn-on time data) representin the unevenness in sensitivity o the photosensitive member supplied from an input device 3, and supplies the thus corrected signal to the laser driver 2b. Input input device 3 is composed of a digitizer for entering the data of laser turn-on time per pixel, recorded for example on a data sheet, in consideration of the unevenness in the sensitivity and in the charging characteristic in the axial direction of the photosensitive member, or a magnetic card or a ROM chip in which said data are recorded in advance. FIG. 2 illustrates the laser exposure operation of a laser beam printer embodying the present invention, wherein the same components as those in FIG. 1 are represented by the same numbers.

In FIG. 2, a DC controller 11 is provided with a BD (beam detection) synchronization signal generator 11a, and sends a video signal to the laser driver 2b. A scanner driver circuit 12 drives a scanner motor 13 at a constant speed, in response to a drive signal supplied from the DC controller 11. A rotary polygon mirror 14, having for example ten mirror faces, is rotated by the scanner motor 13 at a constant speed in the illustrated direction to deflect the laser beam emitted by the laser unit 2c, whereby the thus deflected laser beam is guided through an imaging lens 15 and a scanning mirror 16 and scans, in the horizontal direction, a photosensitive drum 17 composed for example of amorphous photosensitive silicon. Another mirror 18 guides the deflected laser beam, through an optical fiber cable 19, to the BD signal generator 11a, for generating a beam detection (BD) signal to be used, in the known manner, as a start signal for image recording.

Figure 3:
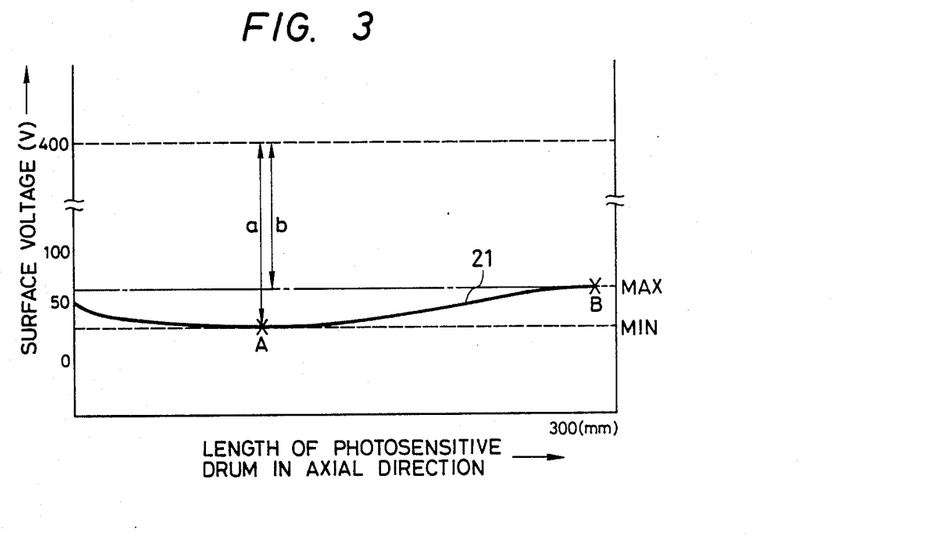
FIG. 3 is a chart showing correction data to be entered from the input means shown in FIG. 1.

FIG. 3 illustrates the correction data 3a, 3b entered from the input device 3 shown in FIG. 1, wherein the ordinate represents the surface potential (V) while the abscissa represents the axial position (mm) of the photosensitive member. The average dark surface potential is assumed to be 400 V.

In FIG. 3, a curve 21 represents the distribution (or characteristic) of light potential (or potential of light portion), or unevenness of sensitivity, of the photosensitive member, and points A and B respectively indicate the light minimum potential and the light maximum potential. An arrow a indicates the difference between the average dark potential and the light minimum potential, and an arrow b indicates the difference between the average dark potential and the light maximum potential.

In the following there will be explained the function of the correction circuit 2d shown in FIG. 1, while making reference to FIG. 3.

The light potential characteristic 21 shown in FIG. 3, corresponding to uniform exposure, is supplied from the input device 3 to the correction circuit 2d, and the potential of the point A (light minimum potential) can be elevated to the value of the point B by a correction of the exposure, or the turn-on time of the laser beam according to an equation (1) to be explained below.

For example, in case of a printer capable or reproducing 64 density levels, the following equation (1) determines the turn-on time TT for correcting the unevenness in potential at the point A in case of a uniform exposure (for example a turn-on time of 61/64):

$$TT = (61/64) \times (b/a) \tag{1}$$

The corrected turn-on time TT is determined by the correction circuit 2d and is sent to the laser driver 2b, whereby the potential of the point A can be elevated to the value of the point B. The turn-on time of the laser beam is corrected for all the pixels in the axial direction of the photosensitive drum 17, based on the data of the difference a between the average dark potential and the light minimum potential and of the difference b between the average dark potential and the light maximum potential in the axial direction of the photosensitive drum 17, entered from the input device 3, and the light potential is thus regulated to be in the axial direction of the photosensitive drum 17.

Figure 4:
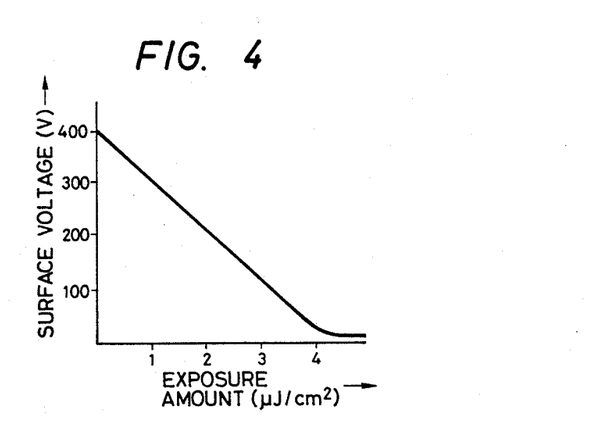
FIG. 4 is a chart showing the E-V characteristic of the photosensitive member.

Since the photosensitive drum 17 employs amorphous silicon in the present embodiment, the E-V characteristic, or the relation of the potential to the amount of exposure, of the photosensitive member can be represented by a first-order function as shown in FIG. 4. Consequently it is rendered possible to simplify the control of the turn-on time of the laser beam and to precisely correct the unevenness in sensitivity of the photosensitive drum 17 not only in the light potential but in the intermediate tone, thereby providing image of high quality.

Figures 6, 7:
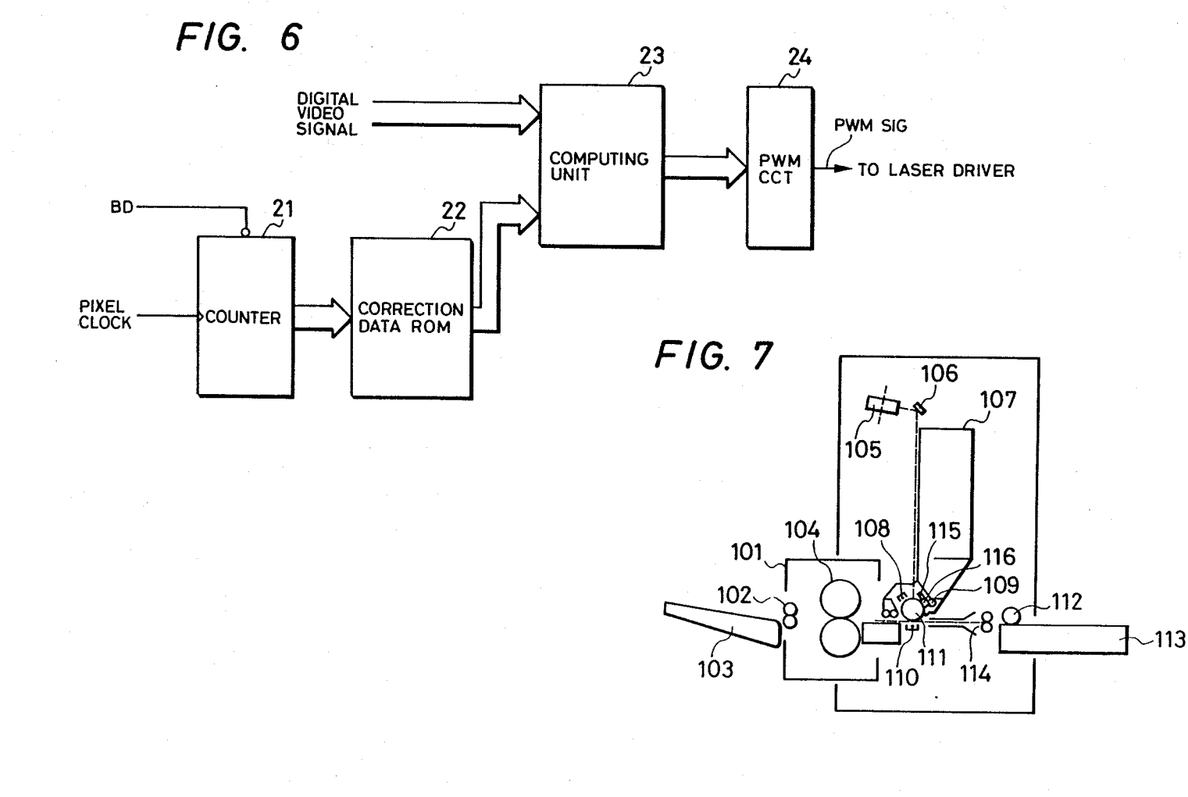
FIG. 6 is a block diagram showing details of a PWM converter 2a and a correction circuit 2d shown in FIG. 1.
FIG. 7 is a schematic view of a laser beam printer representing a second embodiment of the present invention.

FIG. 6 shows an example of the PWM converter 2a and the correction circuit 2d shown in FIG. 1, wherein shown are a counter 21 to be reset by the beam detection signal BD indicating the scanning position of the beam and used for counting pixel clock pulses; a correction ROM 22 for releasing correction data for the image signal in response to the output of counter 21; a computing unit 23 for correcting the digital image signal from the A/D converter according to the correction data from correction ROM 22; and a pulse-width modulating circuit 24 for converting the corrected image signal from the computing unit 23 into a pulse-width modulated signal. The pulse-width modulating circuit 24 is already disclosed detail in the U.S. patent application Ser. No. 765,938 of the present applicant and will not therefore be explained further.

In the following there will be explained the function of the above-explained circuit. The counter 21 counts the pixel clock pulses supplied thereto and supplies the correction ROM 22 with a position signal indicating the scanning position of the photosensitive member. The correction ROM stores, in advance, correction data corresponding to the characteristic of the photosensitive member to be used, for example as shown in FIG. 3, and releases correction data for each pixel, in response to the position signal from the counter 21. The computing unit 23 processes the digital image signal and the correction data for each pixel corresponding to the scanning position of the photosensitive member, and releases corrected image signal, which is corrected according to the potential characteristic of the photosensitive member, and which is converted into a pulse-width modulated signal in the pulse-width modulator 24, for supply to the laser driver 2b.

In the foregoing embodiment the turn-on time of the laser beam is corrected according to the light potential characteristic 21 supplied from the input device 3 as shown in FIG. 3, but the correction may also be achieved in the following manner in case amorphous silicon is employed for the photosensitive drum 17.

Figure 5A:
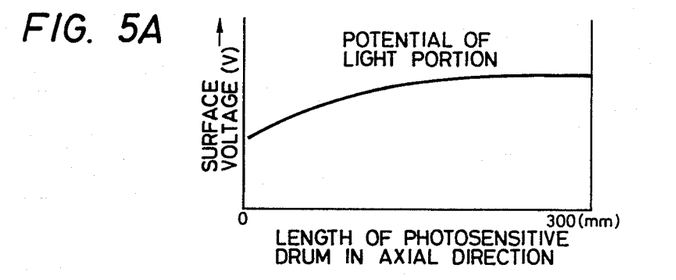
Figs. 5A to 5C are charts showing different patterns of irregularity in the sensitivity of the photosensitive member.
Figure 5B:
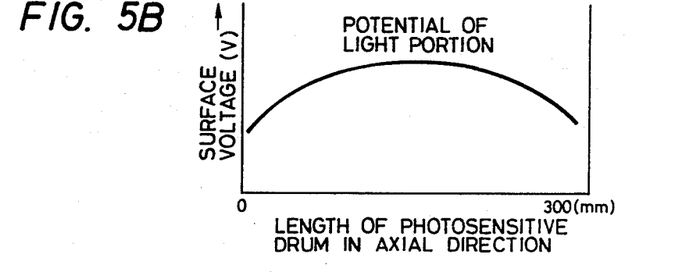
Figure 5C:
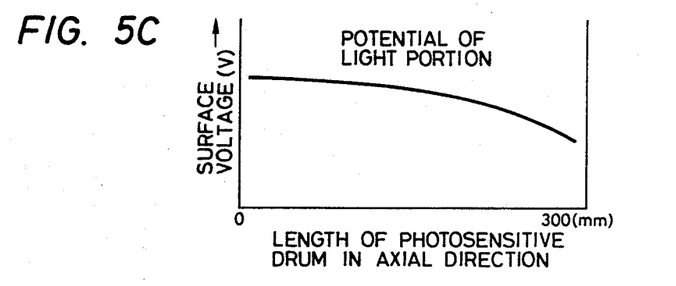

The amorphous silicon photosensitive member is formed by deposition on a metal substrate through decomposition of silan gas, hydrogen gas and minute amount of doping gas by plasma discharge in a pressure of 0.8 to 0.1 Torr, and it is experimentally known that the distribution of sensitivity appears in eihher one of the forms shown in FIGS. 5A to 5C, depending on the gas emission method, pipe position, distribution of discharge etc. It is thus possible to significantly decrease the input operation of the light potential characteristic 21, by designating the average dark potential shown in FIG. 3 and one of the patterns shown in FIGS. 5A to 5C.

As explained in the foregoing, it is rendered possible to precisely correct the unevenness in sensitivity of the photosensitive drum not only with respect to the light potential thereof but also with resepct to the intermediate tone, through the use of input means for entering the turn-on time of the laser beam for each pixel of the image signal corresponding to the distribution of sensitivity in the axial direction of the photosensitive member, and correction means for correcting the laser exposure time in response to the turn-on time data entered by said input means.

(Second embodiment)

Figure 8:
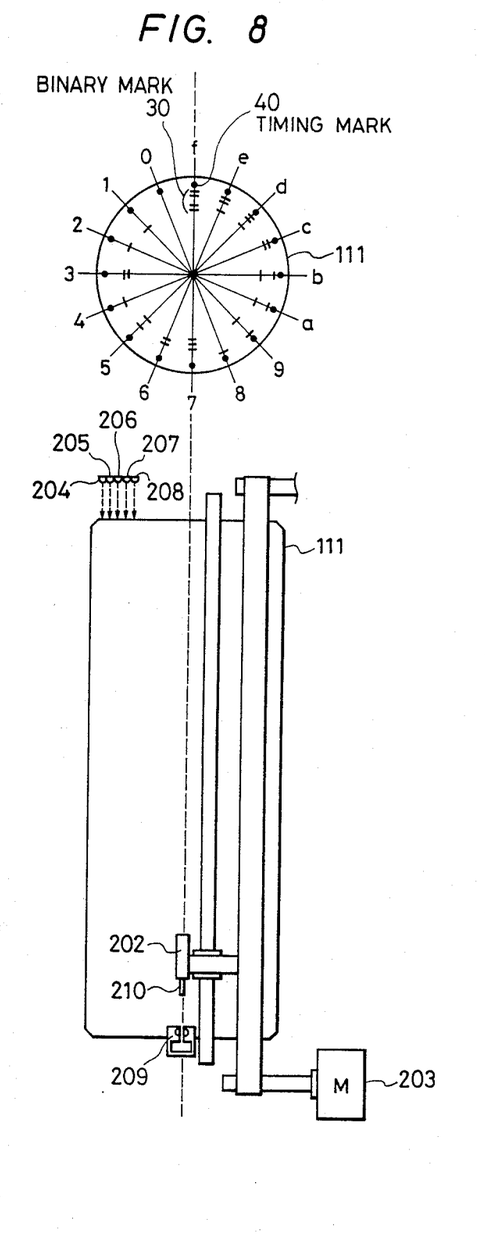
FIG. 8 is a schematic view of a photosensitive drum of the laser printer shown in FIG. 7.
Figure 9:
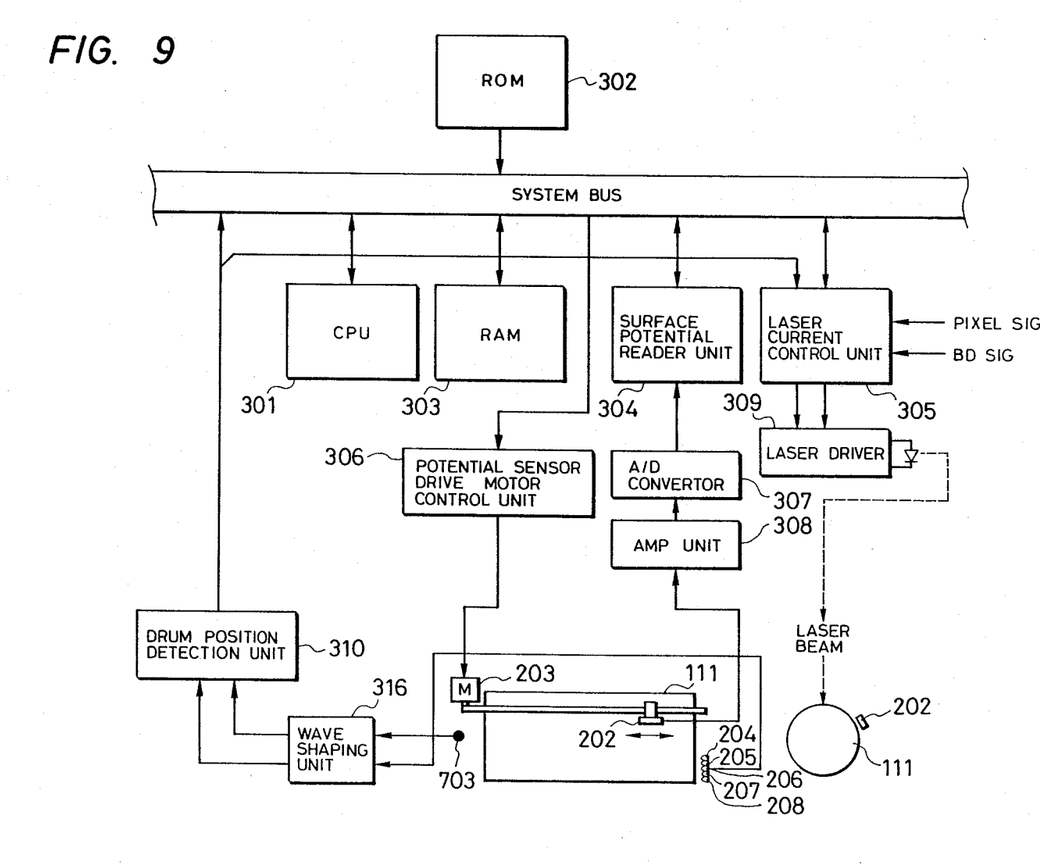
FIG. 9 is a block diagram of the circuit of the second embodiment of the present invention.
Figure 10:
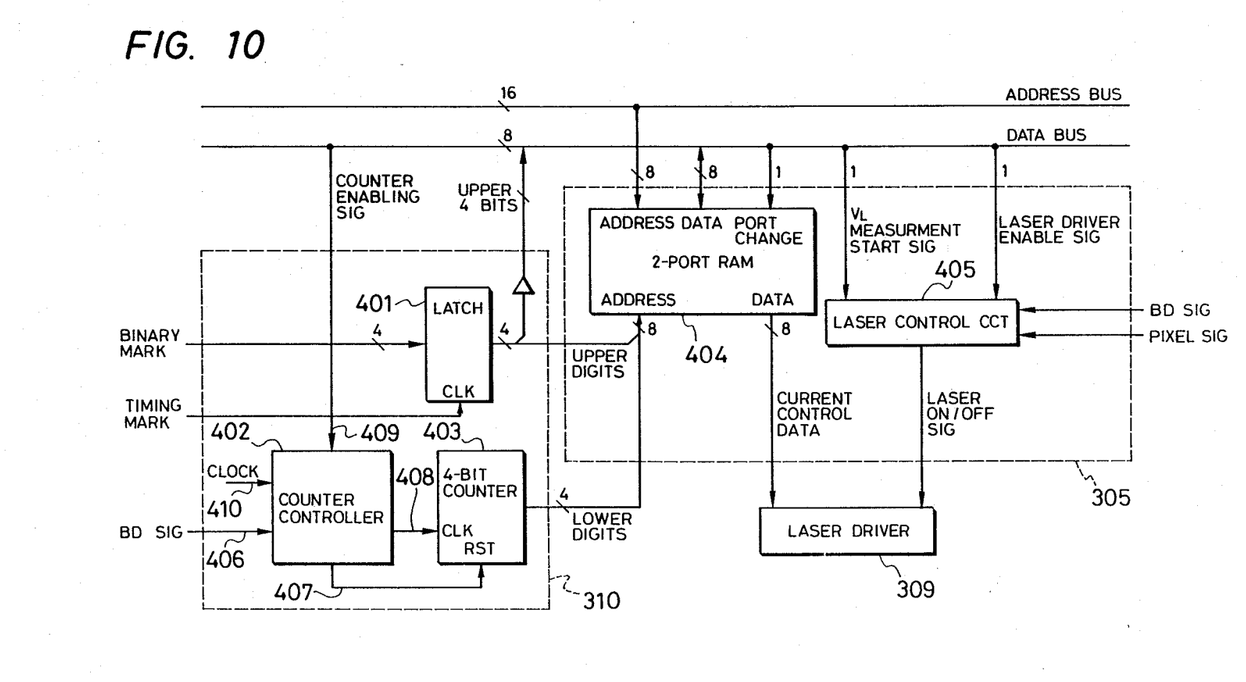
FIG. 10 is a block diagram showing the details of components 305 and 310 shown in FIG. 9.
Figure 11:
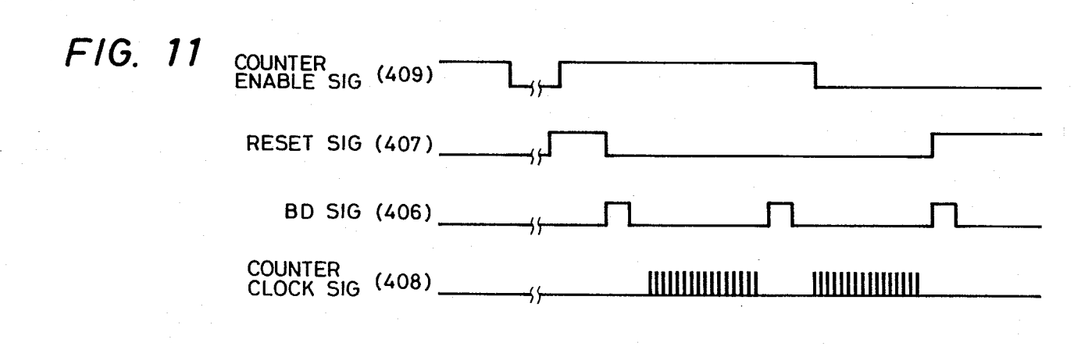
FIG. 11 is a timing chart showing various signals of a counter controller 402 shown in FIG. 10.
Figure 12:
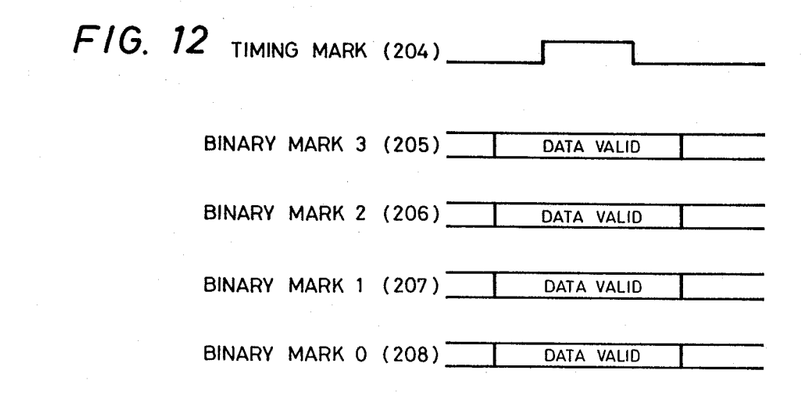
FIG. 12 is a timing chart showing various signals obtained from a sensor shown in FIG. 9.
Figure 13A:
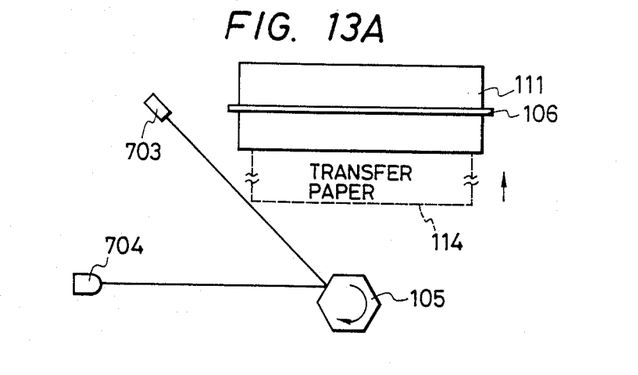
FIG. 13A is a schematic plan view of a laser scanning system of the present invention.
Figure 13B:
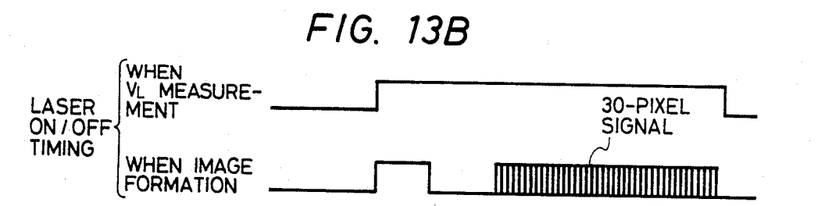
FIG. 13B is a timing chart showing on/off signal for laser beam of the present invention.
Figure 14:
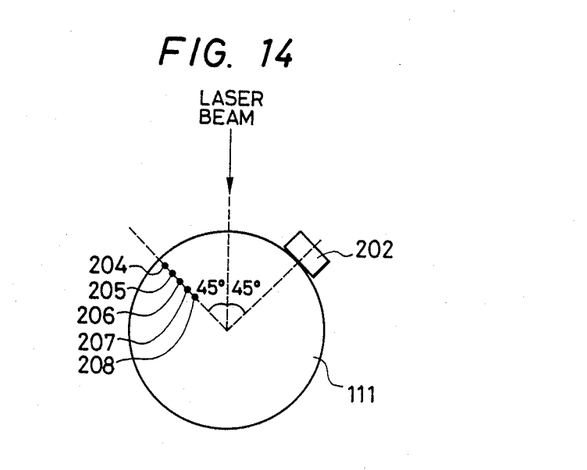
FIG. 14 is a schematic view showing the relationship of a potential sensor, a rotational position detecting sensor and a laser beam when the photosensitive drum is viewed in the axial direction.
Figure 15:
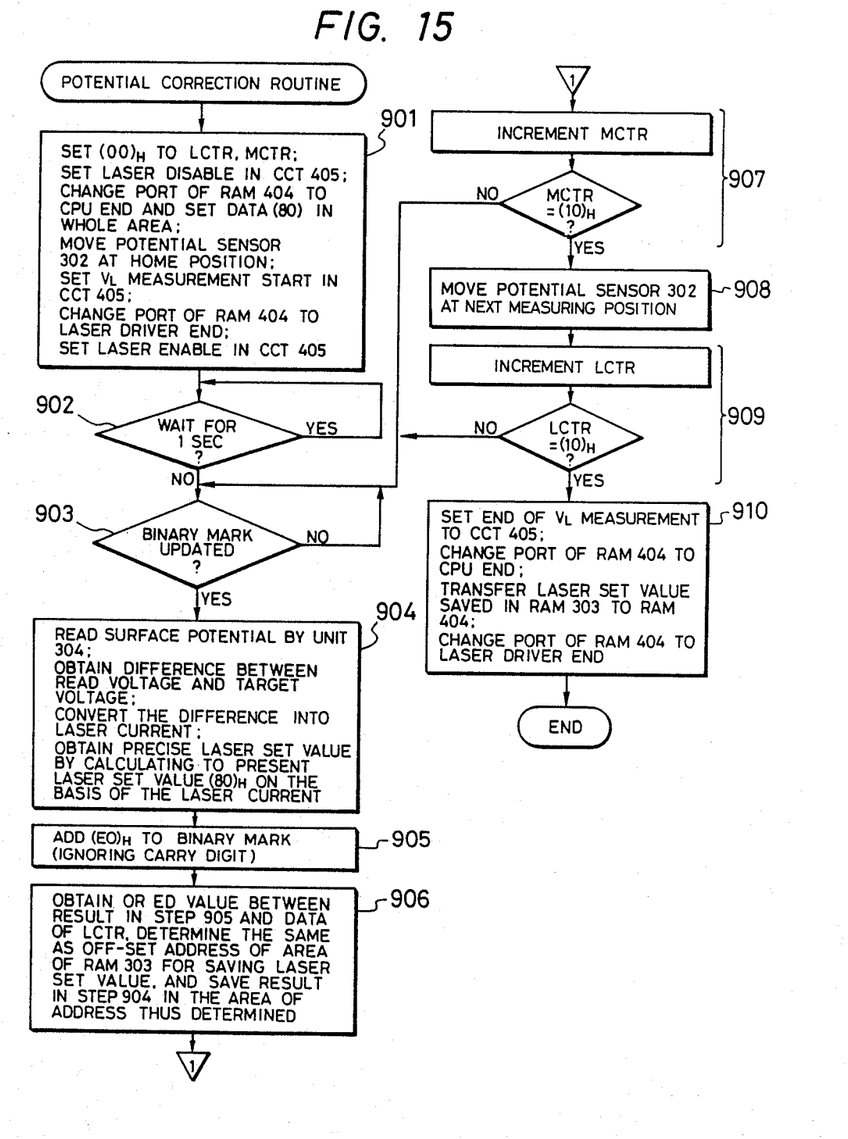
FIG. 15 is a flow chart showing the control sequence of a CPU 302 shown in FIG. 7, relating to the present invention.

Now reference is made to FIGS. 7 to 15 for explaining a second embodiment. FIG. 7 is a schematic lateral view of a laser beam printer, while FIG. 8 is a schematic view of a photosensitive drum, and FIG. 13A is a schematic view of a laser scanning system. FIG. 13B is a timing chart showing the on-off timing i5 of the laser beam in the potential measurement and in the image recording. FIGS. 9 and 10 are block diagrams of a surface potential control circuit for the photosensitive drum. FIG. 11 is a timing chart showing various signals of a counter control circuit 402 shown in FIG. 10, and FIG. 12 is a timing chart showing signals obtained from a binary mark 730 to be explained later. FIG. 14 shows the mutual relation of the potential sensor, rotational position sensor and laser beam when viewed in the axial direction of the photosensitive drum. FIG. 15 is a flow chart of a potential correcting routine of the CPU 302.

In the following there will be explained the function of the laser beam printer of the second embodiment, with reference to FIGS. 7 and 13A.

A photosensitive drum 111, rotated clockwise in FIG. 7, is uniformly charged by a charger 108. A laser beam emitted by a laser diode 704 is directed toward the photosensitive drum 111 through a mirror 106, and scans the drum in the axial direction by a polygon mirror 105 rotated at a high speed, thus forming a main scanning line in a single scanning motion.

The laser beam is turned on and off for each pixel, thereby varying the surface potential of the drum 111 and thus forming an electrostatic latent image. The timing of the image signal in the main scanning direction is determined by a beam detector 703, and the laser beam is always turned on around the position of beam detector 703, in order to enable detection of the scanning position of the laser beam. The synchronization in the main scanning direction is realized by releasing the image signal 30 after a predetermined interval from the beam detection signal. The electrostatic latent image formed on the drum 111 is rendered viible by the deposition of toner by a developing sleeve 109, and the visible image thus obtained is transferred onto a recording sheet 114 by means of a transfer charger 110.

The recording sheet 114 is then transported to a fixing unit 101 for thermal fixation of the image, and is discharged by discharge rollers 102 onto a tray 103. The recording sheet 114 is fed from a cassette 113 by a feed roller 112.

The photosensitive drum 111 is inevitably associated with fluctuation of the surface potential, due to eventual unevenness in its characteristics, thus resulting in a fluctuation in the density of the image finally formed on the sheet 114. Thus, even if the photosensitive drum 111 is stably irradiated by the laser beam, the surface potential fluctuates depending on the position of the drum 111. In the following description, the surface potential of the drum 111 after exposure to the laser beam is represented as $V_L$.

The potential control is for stabilizing the potential $V_L$ by regulating the drive current for the laser diode 704 in such a manner as to correct the fluctuation in the surface potential of the photosensitive drum 111, thereby varying the intensity of the laser beam accordingly. In the present embodiment the potential control is conducted only once at the start of power supply to the apparatus. However the potential control may be conducted suitably before the start of recording operation.

When the potential control is started, the developing sleeve 109 is stopped, and the AC component of the developing bias is cut off to leave the DC component only, in order to prevent toner deposition onto the photosensitive drum 111. The primary charger 108 is naturally turned on. In this state the photosensitive drum 111 is rotated in the same manner as in the recording operation without the supply of recording sheet, and the laser beam is emitted continuously as shown in FIG. 13B.

(1) Then the surface potential of the photosensitive drum 111 is measured at each of the crossing points of 16 divisions in the axial direction and 16 divisions of the circumference of the photosensitive drum 111 (256 points in total).

(2) For each of the crossing points of the photosensitive drum 111, the difference between the measured $V_L$ and the target $V_L$ is determined, and the amount of increase or decrease of, the laser beam intensity for compensating for the difference is calculated, and an optimum laser current is thus determined.

(3) The laser current is stored in an unrepresented laser control circuit to be explained later.

(4) The process returns to the step (1) with the value determined in the step (3). the same process is repeated several times to bring the value $V_L$ of each point of the drum 111 to the target value $V_L$.

In the present embodiment, the process is not repeated since the desired control can be achieved by conducting said process only once.

(5) The potential control is thus terminated.

In the actual recording operation, the laser control circuit retrieves the laser current value in succession, corresponding to the position of the photosensitive drum 111 irradiated by the laser beam. FIG. 13B also shows the laser beam emission in the actual recording operation.

Now reference is made to FIGS. 8 to 15 for explaining the details of the potential control in the present embodiment. At first there will be explained the method of division of the photosensitive drum in the axial and circumferencial direction. FIG. 8 shows the photosensitive drum 111. The division in the circumferential direction is achieved by attaching black marks on the end face of the drum 111 as shown in FIG. 8 and reading the marks with reflective photosensors 204-208, each composed of a light-emitting diode and a photodiode wherein the light emitted by the light-emitting diode and reflected by an object plane is read by the photodiode. diode.

The marks are composed of timing marks 40 indicating the division points for equally dividing the periphery of the drum into 16 sections, and binary marks 30 indicating the positions of the division points. Each binary mark 30 consists of four marks respectively indicating $2^0$, $2^1$, $2^2$ and $2^3$ bits from the center of the drum toward the outside, thus representing hexadecimal numbers $0_h$-$f_h$. FIG. 12 is a timing chart showing signals obtained by reading the timing marks 40 and the binary marks 30 with the photosensors 204 - 208. timing marks 40 are used as strobe signals for reading the binary marks 30. The division in the axial direction is achieved by a motor 203, of which rotation moves a potential sensor 202 along the axis of the photosensitive drum 111. There are also provided a transmissive photosensor 209, composed of a light-emitting diode and an opposed photodiode, for detecting the home position, and a light shield plate 210. When the potential sensor 202 is moved to the home position, the shield plate 210 intercepts the light from the light-emitting diode to the photodiode in photosensor 209, whereby the motor 203 is stopped. Since the axial length of the photosensitive drum 111, the home position and the moving speed of the potential sensor 202 are already known, a microprocessor 301 shown in FIG. 9 brings the potential sensor 202 to 1/16 division points in the axial direction of the drum 111, through timer control. In this manner the axial length and the periphery of the photosensitive drum 111 are respectively divided equally to 16 sections to reproducibly obtain 256 crossing points.

In FIG. 9 there are shown a microprocessor 301 for performing most of the potential control; a ROM 302 for storing the program of microprocessor 301; a RAM 303 functioning as a working memory; an amplifier 308 for amplifying the output of the potential sensor 202; an A/D converter 307 for A/D conversion of the amplifier 308; a surface potential reader 304 for reading the surface potential from the digital signal from the A/D converter 307; a motor controller 306 for driving the motor 203 for moving the potential sensor in response to the instruction from the CPU 301 thereby moving the potential sensor to a desired position; a wave shaping unit 316 for shaping the BD signal from the beam detector 703 and the detection signals from the photosensors 204-208 for supply to a drum position detection unit 310; a laser driver 309 for driving a laser in response to the entered on/off signals; and a laser current control unit 305 for supplying the laser driver 309 with a laser on/off signal and a current control signal for controlling the intensity of light emission of the laser, in response to the image signal, BD signal and position signal of the photosensitive drum. FIG. 10 shows the details of the laser current control unit 305 and the drum position detection unit 310, wherein numbers on signal lines indicate the number of bits.

In the following there will be explained the procedure of potential control (potential measurement) while making reference to a flow chart in FIG. 15 showing the program of the microprocessor 301 and to FIGS. 9 and 10. In response to an instruction from an unrepresented master processor for controlling the entire printer, the microprocessor 301 enters a potential correcting routine. At this point, the photosensitive drum 111 is already rotated and necessary high voltages are supplied to chargers as already explained. At first the microprocessor 301 initializes the areas LCTR, MCTR of the RAM 303, and resets a laser driver enable signal for a laser control circuit 405 (FIG. 10) in the laser current control unit 305, whereby the laser unit is disabled. The above-mentioned LCTR is an unrepresented counter (not shown) indicating the address on the RAM 303 corresponding to the axial position of the drum and the MCTR is an unrepresented counter (not shown) indicating the address on the RAM 303 corresponding to the rotational direction of the drum. Then a standard laser current is set in the entire area of a 2-port RAM 404. Subsequently 2-port RAM 404 is switched to the laser driver 309. Then a $V_L$ measurement start signal is set in order to set the laser control circuit 405 at the $V_L$ measuring mode. Thus, in response to the laser driver enable signal, the laser driver 309 effects D/A conversion of 8-bit data of the 2-port RAM 404 to enable laser beam emission. Finally the laser driver enable signal is set in the laser control circuit 405 to activate the laser through the laser driver 309 (step 901).

After the laser beam emission, the sequence waits, for 1 second, until a laser exposed portion of the drum 111 reaches the potential sensor 202 (step 902).

Then the CPU receives the output of a latch 401 in the drum position detection circuit 310 and awaits the arrival of a new binary mark, in order to effect the potential control at the renewal of the binary mark (step 903).

Subsequently, as shown in a step 904 in FIG. 15, the surface potential $V_L$ of the drum 111 is read from the surface potential reading circuit 304, and there is calculated the intensity of laser beam required for providing the target $V_L$.

Now reference is made to FIG. 14 for explaining a step 905. In FIG. 14 there are shown the photosensitive drum 111, the potential sensor 202 and the mark detectors 204-208, which are respectively displaced by 45° from the irradiating laser beam. Therefore, at the detection of a binary mark, the surface potential detected by the sensor 202 corresponds to a position of a binary mark larger than the abovementioned binary mark by 12d (decimal 12). In the recording operation, an addition of 2d is further required for the binary mark detected by the detectors 204-208 in order to cause laser beam emission with the laser current. Thus 14d in total is added to the detected binary mark value, with the carry-over disregarded. The 2-port RAM 404 has a structure of 8 bits ×256, with 8 address lines, and the value of the binary mark is set in the upper 4 bits of said address lines. On the other hand, the temporary saving of the laser current value to the RAM 303 is conducted with a same arrangement as the 2-port RAM 404. Thus a step 905 adds $(e0)_h$, and a step 906 saves the corrected laser current in the RAM 303.

In this manner the potential control in completed for a point in the circumferential direction of the drum 111. Then the content of the MCTR is increased by one, and there is discriminated whether a condition MCTR=$(10)_h$ has been reached (step 907). If not, the sequence returns from the step 907 to the step 903 to await the arrival of a succeeding binary mark On the other hand, if MCTR=$(10)_h$ in the step 907, indicating the completion of potential control on 16 points along the entire periphery of the drum 111, the potential sensor driving motor 203 is activated to move the sensor axially to a next point (step 908).

Then the content of the LCTR is increased by one, and there is discriminated whether a condition LCTR=$(10)_h$ has been reached (step 909). If not, the sequence returns to the step 903 to effect the potential control operations along the periphery of the drum 111.

On the other hand, in case of LCTR=$(10)_h$ in the step 909, indicating the completion of 16 cycles of the above-explained procedure, all the laser current values have been collected in the RAM 303. The values are then transferred to the 2-port RAM (step 910).

In this manner the potential control is completed.

In the following there will be explained the function in the recording operation. Referring to FIG. 10, the 2-port RAM 404 is set at the laser driver 309, and the counter enable signal is set in a print start counter controller 402.

Reference should be made to FIG. 11 showing various signals of the counter controller 402 in positive logics. When a counter enable signal 409 is set, a reset signal 407 is turned off at the start of an immediately succeeding beam detection (BD) signal 406, whereby the counter controller 402 starts, from the end of the BD signal 406, to count clock pulses 410, having a frequency about 10 times higher than that of counter clock pulses 408. The time required for the laser beam to move from the beam detector 703 to the home position of the potential sensor 202 is already known. Also the time to reach the aforementioned division points is known. Thus the counter controller 402 measures time by counting the clock pulses 410, and releases a counter clock pulse 408 for each of 16 division points.

Counter clock signal 408 is supplied to a clock input terminal of a 4-bit up-counter 403, which thus counts up the clock pulses. The 4-bit output of said counter 403 is connected to the addresses of lower 4 bits of the 2-port RAM 404, of which upper 4-bit addresses receive the output of the binary mark 301. Thus, in response to the main scanning of the laser beam (scanning in the axial direction of the drum 111) and the sub scanning (achieved by the rotation of the drum 111 the corrected laser current values are read in succession from the 2-port RAM 404 and set in the laser driver 309. As already explained in the foregoing, the relationship between the laser current value read from the 2-port RAM 404 and the laser irradiating position of the photosensitive drum 111 has a 1:1 correspondence with the positional relationship in the potential control. Consequently the fluctuation in the surface potential of the drum 111 is precisely corrected, and there can be obtained a satisfactory image without density fluctuation.

Though the foregoing embodiment has been limited to a monochromatic laser beam printer, the present invention can also be applied to a color laser beam printer employing plural drums, in order to obtain a color image with satisfactory color reproducibility.

Though the foregoing embodiment has been limited to a laser beam printer, the present invention is applicable also to other recording apparatus, such as a printer employing light-emitting diodes or a printer employing a cathode ray tube.

The present invention is not limited to the foregoing embodiment but is subject to various modifications and variations within the scope and spirit of the appended claims.

What is claimed is:

1. An image recording apparatus comprising:
  recording means for recording an image on a recording medium;
  output means for outputting data representing the characteristics of the recording medium at each position thereon; and
  control means for controlling an operating condition of said recording means at each position on the recording medium in accordance with the data output from said output means at each position on the recording medium.

2. An image recording apparatus according to claim 1, further comprising detector means for detecting a surface state at each position of the recording medium, wherein the data output from said output means is associated with a detection result of said detector means, and wherein said output means includes memory means for storing the data therein.

3. An image recording apparatus according to claim 2, wherein said detector means is adapted to detect the surface potential on the recording medium.

4. An image recording apparatus according to claim 1, wherein said recording means comprises laser beam emission means for irradiating the recording medium, wherein said control means is adapted to control the current to be supplied to said laser beam emission means in accordance with the data.

5. An image recording apparatus according to claim 1, further comprising the recording medium wherein said recording medium includes an amorphous silicon photosensitive member.

6. An image recording apparatus comprising:
  recording means for recording an image on a recording medium;
  memory means for storing a plurality of parameters representing the characteristics of the recording medium at a plurality of positions on the recording medium; and
  control means for controlling an operating condition of said recording means at each of the plurality of positions on the recording medium in accordance with the plurality of said parameters read from said memory means.

7. An image recording apparatus according to claim 6, wherein further comprising the recording medium said recording medium is a photosensitive member, and said memory means is adapted to store, as said parameters, data associated with the surface potential of said photosensitive member.

8. An image recording apparatus according to claim 7, wherein said recording means comprises means for irradiating said photosensitive member with a beam, and said control means is adapted to control the duration of the beam according to the data.

9. An image recording apparatus according to claim 7, further comprising detector means for detecting the surface potential of said photosensitive member, wherein said memory means is adapted to store the data corresponding to the result of detection of said detector means.

10. An image recording apparatus according to claim 1, further comprising the recording medium, wherein said recording medium is a photosensitive drum, and wherein said output means outputs data representing the characteristics of said photosensitive drum at a plurality of positions in the axial directions of said photosensitive drum.

11. An image recording apparatus according to claim 6, further comprising the recording medium, wherein said recording medium is a photosensitive drum, and wherein said memory means stores the plurality of parameters representing the characteristics of said photosensitive drum at a plurality of positions in the axial direction of said photosensitive drum.

* * * * *

UNITED STATES PATENT AND TRADEMARK OFFICE
CERTIFICATE OF CORRECTION

PATENT NO. : 4,794,413

DATED : December 27, 1988

INVENTOR(S) : KOJI YAMAZAKI ET AL.

It is certified that error appears in the above-identified patent and that said Letters Patent is hereby corrected as shown below:

COLUMN 11

Line 2, "6, wherein further comprising the recording medium" should read --6, further comprising the recording medium wherein--.

COLUMN 12

Line 8, "directions" should read --direction--.

Signed and Sealed this

Twenty-fifth Day of July, 1989

Attest:

DONALD J. QUIGG

Attesting Officer

Commissioner of Patents and Trademarks